United States Patent [19]

Rakavy et al.

[11] Patent Number: 5,978,912
[45] Date of Patent: *Nov. 2, 1999

[54] NETWORK ENHANCED BIOS ENABLING REMOTE MANAGEMENT OF A COMPUTER WITHOUT A FUNCTIONING OPERATING SYSTEM

[75] Inventors: Yuval Rakavy, Jerusalem, Israel; Ian Anderson, Guilford, United Kingdom; Andrew Garsten, Los Angeles, Calif.; James Roche, Guildford Surrey; Michael Peter R. Burton, Surbiton, both of United Kingdom

[73] Assignee: Phoenix Technologies Limited, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/821,745

[22] Filed: Mar. 20, 1997

[51] Int. Cl.$^6$ .................................................... G06F 9/06
[52] U.S. Cl. .............................................. 713/2; 709/222
[58] Field of Search ................................... 395/651, 652, 395/653, 712, 200.5, 200.51, 200.52, 681; 713/1, 2, 100; 709/220, 221, 223, 301

[56] References Cited

U.S. PATENT DOCUMENTS

| | | | |
|---|---|---|---|
| 4,335,426 | 6/1982 | Maxwell et al. | 364/200 |
| 4,724,521 | 2/1988 | Carron et al. | 364/300 |
| 4,752,870 | 6/1988 | Matsumura | 364/200 |
| 4,885,700 | 12/1989 | Croll | 379/269 |
| 4,958,278 | 9/1990 | Meguro | 364/200 |
| 4,975,950 | 12/1990 | Lentz | 380/4 |
| 5,008,814 | 4/1991 | Mathur | 364/200 |
| 5,019,963 | 5/1991 | Alderson et al. | 364/200 |
| 5,142,680 | 8/1992 | Ottmann et al. | 395/700 |
| 5,155,847 | 10/1992 | Kirouac et al. | 395/600 |
| 5,210,875 | 5/1993 | Bealkowski et al. | |

(List continued on next page.)

OTHER PUBLICATIONS

M. Fletcher, dolt: A Network Software Management Tool, Lisa VI, Oct. 1992, pp. 189–196, Abstract only.

B. Young et al., Remote Initial Program Load and Library Maintenance for Satellite Computers, IMB Technical Disclosure Bulletin vol. 13:5, Oct. 1970, p. 1203.

B. Croft et al., Bootstrap Protocol (BOOTP), RFC 951, Sep. 1985.

F. Paul, Intel Debuts High–End Server, Network World, Jul. 1993.

T. Smith Compaq to Offer New PCs, Including Diskless Models, Network World, May 1990.

IBM Technical Disclosure Bulletin, Update Mechanism for Personal Computer System Resident Firmware, vol. 34:10B. Mar. 1992, pp. 133–136.

R. Bealkowski et al., IMB Technical Disclosure Bulletin, vol. 35:7, Dec, 1992, p. 250.

M. Bradley, Open Boot Firmware, USENIX—Winter 1992 Technical Conference, pp. 223–235.

*Standard BIOS 32–bit Service Directory Proposal*, revised Jun. 22, 1993 (visited Mar. 4, 1997) <http://www/ptltd.com/techs/specs.html>.

*Inside the NC*:Peter Wayner, BYTE, Nov. 1996, vol. 21, No. 11, pp. 105–110.

*Primary Examiner*—Kevin A. Kriess
*Attorney, Agent, or Firm*—Foley & Lardner

[57] ABSTRACT

A method and system of communicating with a computer through a network prior to booting the computer's operating system or after operating system failure is provided. A multitasking kernel is implemented in a network enhanced BIOS. External references in a NIC device driver are resolved to reference services provided by the network enhanced BIOS. A workstation coupled to the computer through a network may be used to access and set status on the computer prior to loading the operating system or after operating system failure. The multitasking kernel may be operated simultaneously with a conventional BIOS. The computer may be further provided with a means for alerting the workstation in the event of a POST failure or operating system crash.

60 Claims, 10 Drawing Sheets

U.S. PATENT DOCUMENTS

| | | | |
|---|---|---|---|
| 5,212,369 | 5/1993 | Karlisch et al. | 235/380 |
| 5,230,052 | 7/1993 | Dayan et al. | 395/700 |
| 5,257,378 | 10/1993 | Sideserf et al. | 395/700 |
| 5,265,252 | 11/1993 | Rawson, III et al. | |
| 5,268,928 | 12/1993 | Herh et al. | 375/8 |
| 5,291,585 | 3/1994 | Sato et al. | |
| 5,307,497 | 4/1994 | Feigenbaum et al. | |
| 5,325,532 | 6/1994 | Crosswy et al. | |
| 5,349,643 | 9/1994 | Cox et al. | 380/25 |
| 5,355,490 | 10/1994 | Kou et al. | |
| 5,355,498 | 10/1994 | Provino et al. | |
| 5,359,730 | 10/1994 | Marron | 395/650 |
| 5,377,269 | 12/1994 | Heptig et al. | |
| 5,390,324 | 2/1995 | Burckhartt et al. | |
| 5,404,494 | 4/1995 | Garney. | |
| 5,404,527 | 4/1995 | Irwin et al. | 395/700 |
| 5,410,699 | 4/1995 | Bealkowski et al. | |
| 5,444,850 | 8/1995 | Chang | 395/200.1 |
| 5,446,898 | 8/1995 | Bealkowski et al. | |
| 5,452,454 | 9/1995 | Basu | 395/652 |
| 5,473,772 | 12/1995 | Halliwell | 395/650 |
| 5,481,709 | 1/1996 | Bealkowski et al. | |
| 5,481,754 | 1/1996 | Piazza. | |
| 5,495,611 | 2/1996 | Bealkowski et al. | |
| 5,535,357 | 7/1996 | Moran et al. | |
| 5,588,146 | 12/1996 | Leroux | 395/601 |
| 5,623,604 | 4/1997 | Russell et al. | 395/200 |
| 5,657,448 | 8/1997 | Wadsworth et al. | 395/652 |
| 5,659,748 | 8/1997 | Kennedy | 395/652 |
| 5,680,547 | 10/1997 | Chang | 395/200.01 |
| 5,696,968 | 12/1997 | Merkin | 395/652 |
| 5,701,477 | 12/1997 | Chejlava | 395/652 |
| 5,715,456 | 2/1998 | Bennett et al. | 395/652 |
| 5,732,268 | 3/1998 | Bizzarri | 395/652 |

NETWORK ENHANCED BIOS ENABLING REMOTE MANAGEMENT OF A COMPUTER WITHOUT A FUNCTIONING OPERATING SYSTEM

FIELD OF THE INVENTION

This invention relates generally to a method and system for enabling the remote management of a computer over a network without the aid of an operating system functioning on the computer and more particularly to a method and system for enhancing a computer's BIOS to accommodate remote access and maintenance without the aid of an operating system executing on the computer.

BACKGROUND OF THE PRESENT INVENTION

System errors causing operating system failure remain a pervasive problem in the computer industry. Such errors may occur as a result of hardware failure, user error, and for other reasons. These failures, particularly in the case of networked desktop computers or network system servers, may result in extended unavailability of computer resources and significant financial loss due to user down-time.

Currently, there exists no effective process for completely eliminating such system errors causing operating systems to crash. In many cases, the only method of avoiding recurring crashes is to perform a post-mortem diagnosis, before rebooting the operating system, of the actions which brought about the crash. However, because of the physical difficulty in accessing and analyzing the failed computer and because time is often of the essence in making the system available, many users simply reboot the operating system without analyzing the problems which led to the crash.

One example of where such access is necessary occurs with network servers. Such network servers are often critical to an organization's efficiency, and, yet, may be configured without certain hardware, such as a keyboard and computer display, necessary for performing a postmortem analysis. Network operators are therefore often hurried into simply rebooting the network server without performing a proper diagnosis of the problem.

The problem of remotely analyzing and administering a computer also occurs in the case of wide area, or local area, networks where system administrators may be required to remotely maintain several computers. In typical operation, the operating system executing on the remote computers allows the system administrators to access and modify various parameters on the remote computer. However, in the event of an operating system crash, current systems provide no means for the administrator to access or diagnose the remote computer. Moreover, current systems typically do not allow the administrator to access the remote computer prior to loading an operating system on the remote computer. For example, U.S. Pat. No. 5,390,324 to Burckhartt et al. (the "Burckhartt patent") claims a failure recovery system allowing dial-up access to the failed computer once the failed computer has loaded a reduced operating system stored on a secondary partition on the computer's hard disk. The system of the Burckhartt patent boots off the secondary partition containing the secondary operating system when a detection means detects a system time-out indicating a primary operating system failure.

The following background describes the typical structure and startup procedure of an IBM compatible personal computer ("PC"), however, the concepts are generally applicable to a variety of computer systems. Upon system reset, CPU control is passed to a portion of the computer's Basic Input/Output System (BIOS) known as, the Power On System Test, or Power On Self Test, (POST). The terms system reset and system start-up, as used herein, shall be synonymous and shall include any system start-up, reboot, system reset or other operation causing the commencement of the initialization or reinitialization of the initial program load operation of the computer.

The POST is typically stored in read-only-memory (ROM) and is used to initialize the standard system components, such as system timers, system DMA (Direct Memory Access) controllers, system memory controllers, system I/O devices and video hardware. As part of its initialization routine, the POST sets the default values for a table of interrupt vectors. These default values point to standard interrupt handlers in the ROM BIOS but may be modified to access customized interrupt handlers. The POST also performs a reliability test to check that the system hardware, such as the memory and system timers, are functioning correctly. After system initialization and diagnostics, the POST surveys the system for firmware located on non-volatile memory on optional hardware cards (adapters) in the system. This is performed by scanning a specific address space for memory having a given signature. If the signature is found, control is passed to the firmware which then initializes the device on which it is located.

After the hardware initialization is performed, the POST reads a block of data from a predetermined location from the boot device, usually the hard disk or a diskette drive, into memory, and passes control to the program in that data block. This program, known as a bootstrap loader, then loads a larger program into memory. If the larger program is properly loaded into memory the boot program passes control to it. The operating system is then initialized and gains control of the CPU. As described below, on certain disk-less, or media-less, workstations the adapter firmware located on a network interface card re-routes the pointers used to bootstrap the operating system to download the operating system from an attached network.

The BIOS further comprises a set of routines, or interrupt handlers, for interfacing with the computer and its peripheral components. The BIOS interrupt handlers are accessed through the use of hardware or software interrupts. The addresses of these interrupt handlers are stored in an interrupt vector table. As noted above, this vector table may be modified to point to customized interrupt handlers. The BIOS is generally described by P. Norton in *The Peter Norton PC PROGRAMME'S BIBLE*, Microsoft Press (1993).

While the BIOS interfacing routines were used by the MS-DOSE operating system, modern operating systems, such as Windows-95™, available from Microsoft Corporation ("Microsoft"), do not extensively utilize the BIOS interfacing routines. Generally, Windows-95, and other modern operating systems, make use of device drivers specific to a particular type and model of peripheral hardware component when communicating with such peripheral hardware components. Device drivers provide a uniform interface through which more general purpose software may interact with the peripheral components. These device drivers may replace an existing BIOS interrupt handler, or provide additional functionality which is otherwise not provided. The application software is thus freed from having to interact with the specifics of each hardware device.

Many operating systems, including MS-DOS releases since MS-DOS 2.0, and releases of Windows up to Windows 3.11, include the ability to load installable device drivers from disk when the operating system is booted up. A user may load installable device drivers in the MS-DOS operating system by including the command DEVICE=device_file in the CONFIG. SYS file. MS-DOS then reads each device driver file and loads the device driver into memory. Windows-95 has the ability to detect the peripheral hardware components using the PCI (Peripheral Component Interconnect) and Plug and Play functions of the BIOS, and to load the appropriate drivers for the installed peripheral hardware components automatically.

While the use of installable device drivers provides a high degree of flexibility in handing peripheral hardware components, such as network interface cards (NIC), heretofore, an operating system executing on the failed computer has been relied on to load the software driver and provide any supporting functions necessary. If an operating system will not boot, or if it is necessary to perform a postmortem diagnosis prior to reloading an operating system, no software driver for the NIC will be loaded, thus an administrator will not be able to use software acting through the NIC to access the system remotely. There exists a need, therefore, for a method and system of utilizing an installable NIC device driver which is available before an operating system is bootstrapped and does not rely on operating system support. Operating system, as the term is used herein, shall mean system-level software that controls the execution of user-level programs and that provides services to such user-level programs such as resource allocation, scheduling, I/O control and data management. Exemplary of such operating systems are MS-DOS™, Windows-95™, Windows-NT™, all available from Microsoft, MacOS™, available from Apple Computer, and various versions of Unix® available from a number of vendors including Sun Microsystems. Modern operating systems, such as Windows-NT, often include a protected mode kernel or base system at the core of the operating system.

A key problem in the remote administration of computer systems is the fact that there are hundreds of different network interface card types available from a number of vendors, each of which may be programmed differently and may utilize a unique device driver. Developing new device drivers for each of these card types would be expensive and lead to unreliability. It is therefore an object of the present invention to utilize the network enhanced BIOS to use standard NIC device drivers developed for existing operating systems, and thus not require customized device driver software for each of the available network interface card types.

This objective may be achieved by utilizing standard interfaces defined by certain operating system vendors. To support a virtually unlimited variety of network card types, operating system vendors have defined standard interfaces that are to be used by network interface card device drivers. This allows the operating system to support any NIC which supplies driver software that adheres to the standard interface. Novell, Inc. ("Novell") has defined one such standard, the Open Datalink Interface (ODI). Drivers written according to the ODI standard can be used by NetWare™, available from Novell. Microsoft has defined a second standard, the Network Driver Interface Specification (NDIS). Drivers written according to the NDIS standard can be used by Microsoft operating systems (e.g. Windows NT). Additionally, other standards are available for versions of the UNIX™ operating system.

SUMMARY OF THE INVENTION

In addition to the object listed above, it is an object of the present invention to provide a method and system for communicating with a computer coupled to a network without the necessity of utilizing the computer's operating system.

It is a further object of the present invention to provide a method and system for communicating with a computer coupled to a network prior to the bootstrapping of the computer's operating system. It is a still further object of this invention to provide the necessary additional software on the computer and software which may be executed on a second computer remote from the first computer fitted with the network enhanced BIOS, and which second computer need not itself be fitted with such network enhanced BIOS such as to enable the transfer of commands and information between the two computers.

The present invention is directed to a method and system of communicating with a computer through a network prior to booting the computer's operating system or after operating system failure. A networking application program interface (API) is implemented in a network enhanced BIOS fitted to a first computer. This computer is preferably supplied with a NIC card and NIC device driver file. External references in the NIC device driver which would normally be resolved to services provided by elements of the operating system are instead resolved to reference services provided by the API of the network enhanced BIOS. A second computer coupled to the first computer through the network may transfer commands, status and data prior to the loading of the operating system or after operating system failure. The first computer may be further provided with a means for alerting the second computer in the event of a POST failure or operating system crash.

BRIEF DESCRIPTION OF THE DRAWINGS

For a more complete understanding of the present invention, reference is made to the following Detailed Description taken in conjunction with the accompanying drawings in which.

DETAILED DESCRIPTION

Preferred embodiments of the present invention will now be described with continued reference to the drawings.

Figure 1:
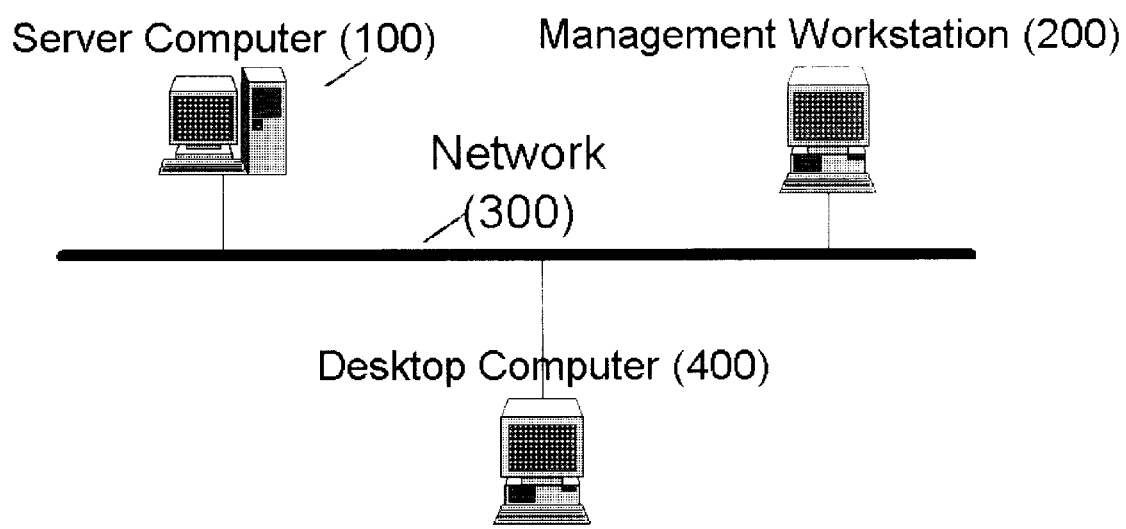
FIG. 1 is a functional block diagram of an exemplary system architecture including a server computer, a desktop computer, a networked management workstation and a network for practicing the invention.

FIG. 1 shows an overall view of a preferred embodiment of the system architecture. A server computer 100 is physically connected to the management workstation 200 via network 300. Network 300 may be any of a number of commercially available local or wide area networks including Novell's NetWare™. A "network" or "computer network", as such term is used herein, shall be generally defined as a group of two or more connected computers; two computers being "connected" when they can exchange messages or data. Thus, for example, the connection technology, the network topology and the network protocols can vary and include, for example and without limitation, in addition to the LAN and WAN networks mentioned above, two computers directly connected via a serial or parallel interface and a cable, two computers directly connected via modem connections over a public switched telephone network, such as via the so-called "plain old telephone service", two computers connected via an ISDN connection over a public telephone network, or two computers coupled across an internet. A desktop computer 400 may also be connected to network 300. The server computer and desktop computer shown are exemplary and may each be one of a multiplicity of such computers.

Figure 2:
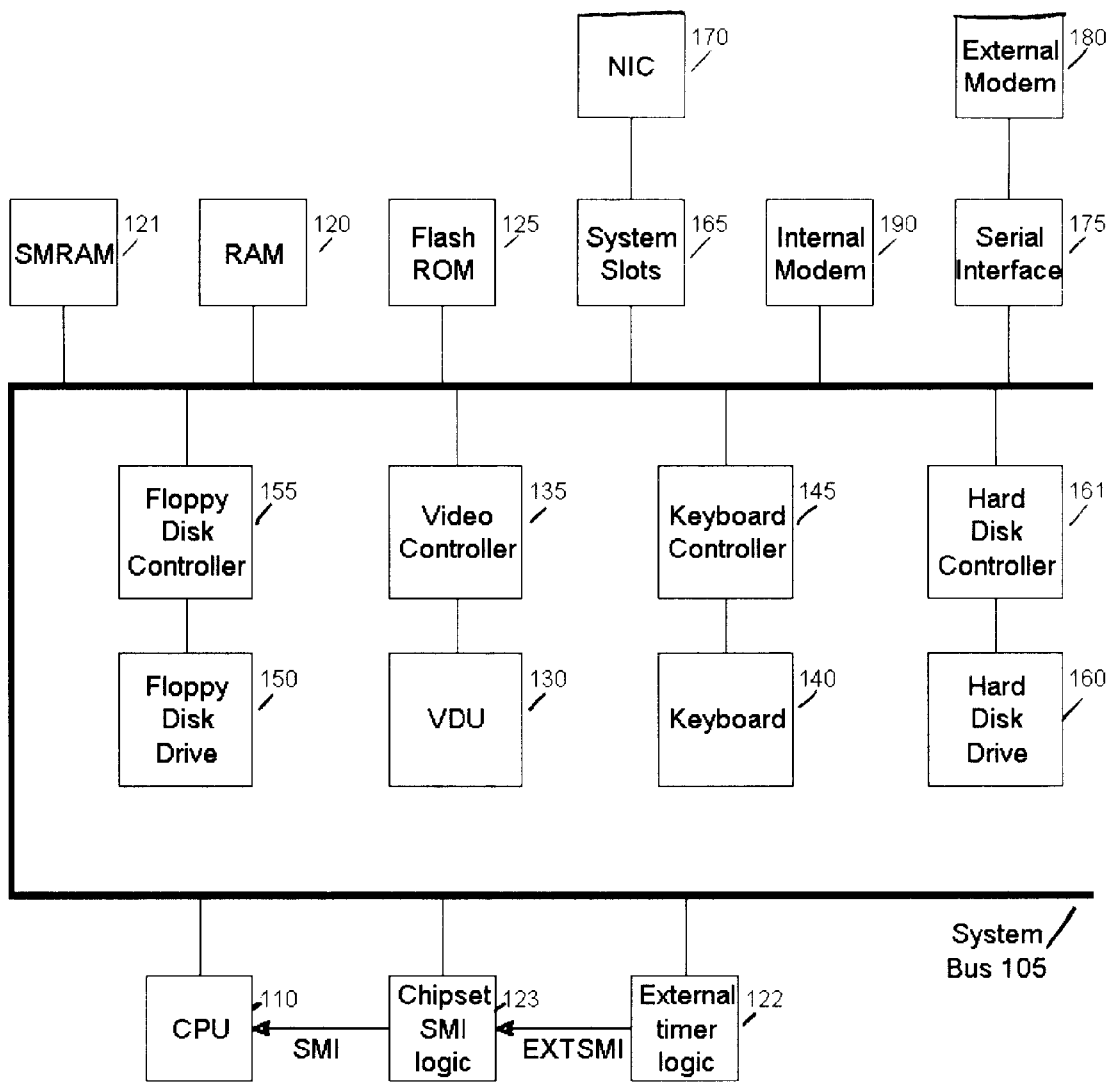
FIG. 2 is a functional block diagram of an exemplary computer system, including the computer system components, for practicing the invention.

With reference now to FIG. 2, a computer 400 on which the present invention may be practiced is shown. The computer 400 shown in FIG. 2 and described herein is exemplary and may be modified without deviating from the present invention. Moreover, although the computer 400 in FIG. 1 is shown as a desktop computer, it is understood that the term computer as used herein shall include, without limitation, desktop computers (shown as 400 in FIG. 1) and server computers (shown as 100 in FIG. 1), or embedded systems (not shown) such as Auto Teller Machines, or Point of Sale terminals, or Vending Machines.

A system bus 105 forms the backbone of the components of the computer 400. Attached to the system bus 105 are a central processor unit (CPU) 110 and system random access memory (RAM) 120. The CPU preferably operates in at least two modes, real mode and protected mode—as is commonly known in the art. Non-volatile memory 125, preferably in the form of flash ROM, is connected to the system bus 105. The non-volatile memory 125 does not change state when the computer 400 is powered down or reset. User input/output may be performed through a visual display unit 130, video controller 135, keyboard 140, and keyboard controller 145. The CPU 110 and RAM 120, as well as the video controller 135, may optionally be coupled via a separate local bus (not shown). Mass storage devices may include a floppy disk drive 150, and associated floppy disk controller 155, and/or a hard disk drive 160 and associated hard disk controller 161. In one embodiment of the present invention implementing the watchdog timer mechanism described below, the computer 400 also includes System Management RAM (SMRAM) 121, an external timer 122, and chipset external logic 123. Preferably, the timer 122 is implemented within the chipset logic 123. As noted above, the description of FIG. 2 is exemplary and may be modified in a number of ways which will be apparent to one of skill in the art without deviating from the present invention. For example, the invention may be implemented on disk-less workstations not having a floppy disk drive 150 or a hard disk drive 160.

The computer 400 also preferably includes a network interface card (NIC) 170, also known as a network adapter. The NIC 170 is preferably connected to the system bus 105 via a set of system circuit slots 165 within the computer. The slots 165 preferably conform to an industry standard, such as Intel's PCI standard. Alternatively, the NIC 170 may be directly coupled to the system bus 105 without use of a system circuit slot.

Alternatively, the computer 400 may substitute for the NIC 170, or in addition to the NIC 170, a modem. Such modem may be an internal modem 190, which may be connected to the system bus 105 or to one of the set of system circuit slots 165, and/or an external modem 180, which typically is connected to a serial interface 175 which is connected to the system bus 105. Optionally, the computer 400 may be networked directly to a workstation 200 via a cable connection to the serial interface 175 or a parallel interface (not shown).

Figure 3A:
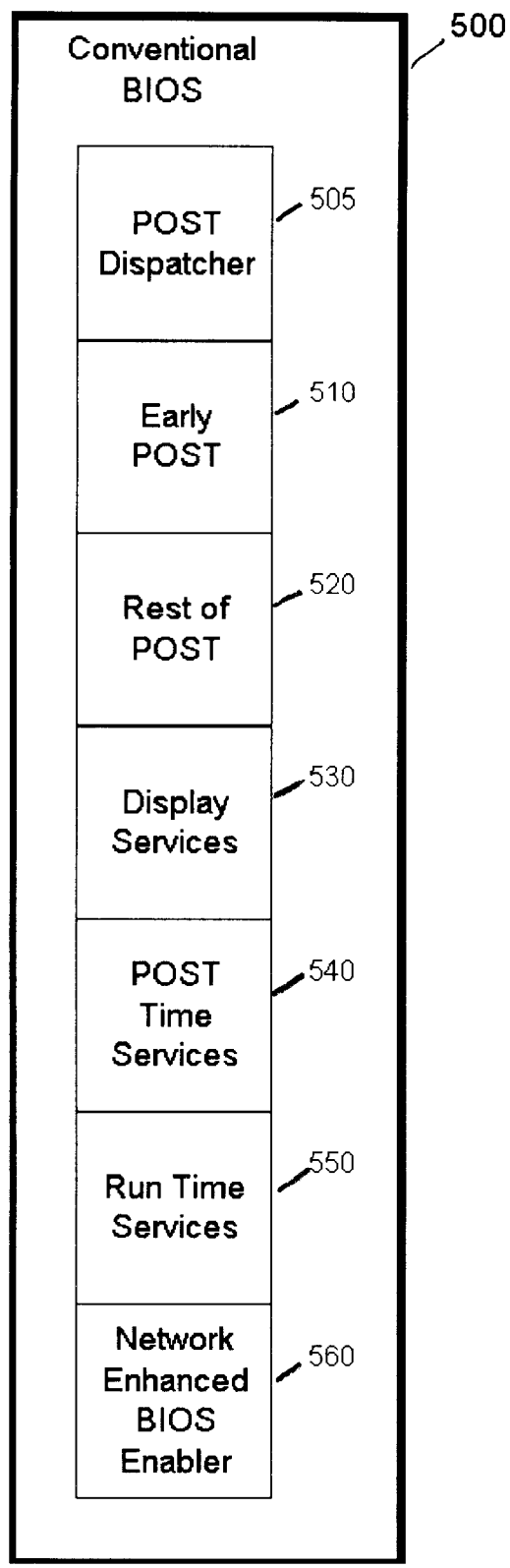
FIG. 3A is a functional block diagram of the conventional BIOS section of a computer showing the major functional components of a portion of BIOS created in accordance with the present invention.
Figure 3B:
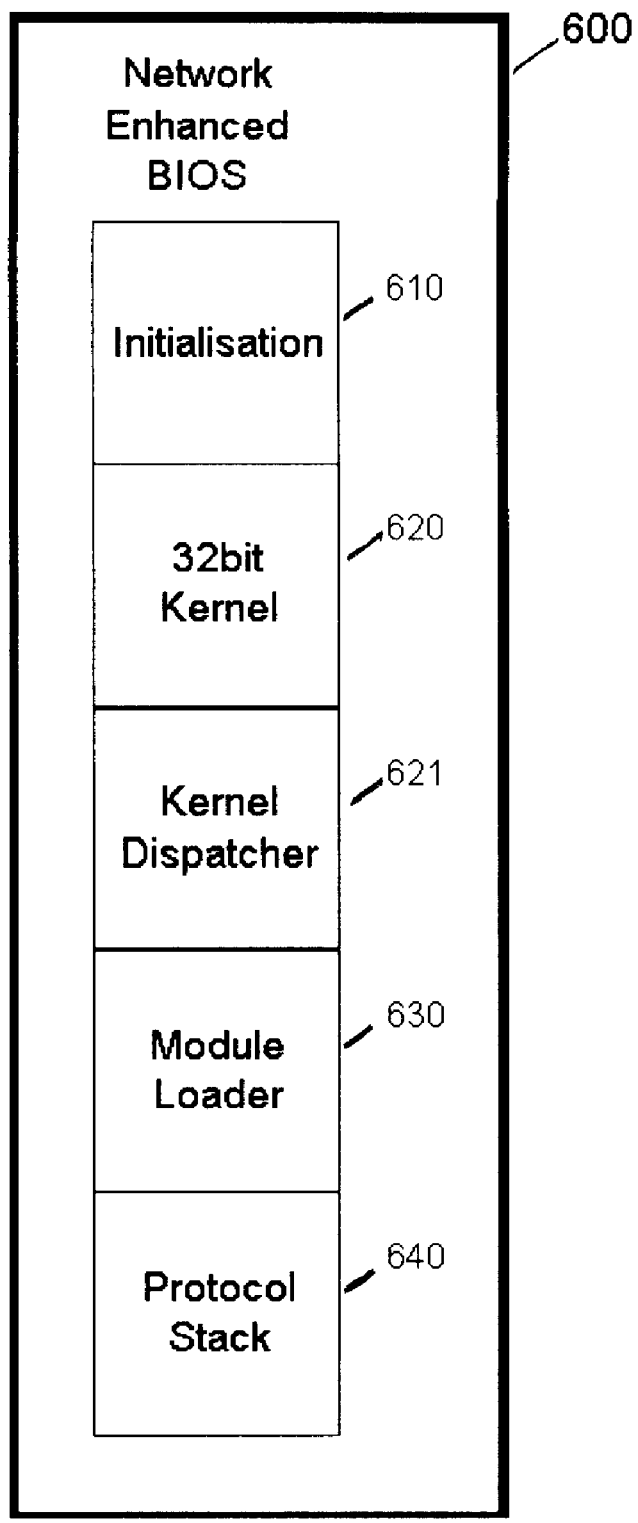
FIG. 3B is a functional block diagram of a network enhanced BIOS section of a computer, showing the major functional components in accordance with the present invention.

Referring now to FIGS. 3A and 3B, the component modules of the conventional BIOS section 500 and network enhanced BIOS section 600 of a BIOS of a computer created in accordance with the present invention are illustrated. The conventional BIOS section 500 consists of early POST 510, the rest of POST 520, display services 530, such as cursor position and write character, which are used internally within the BIOS to display error and status information, POST time services 540 such as the hardware test routines, run time services 550 such as interrupt 10H Video output services and interrupt 13H disk access services, and enabler code 560. The enabler code 560 provides the conventional BIOS 500 with the ability to detect and load the network enhanced BIOS 600, and to give control to the network enhanced BIOS 600 initialization entry point. It further contains the routines which allow cooperative multitasking between the Conventional BIOS 500 and the network enhanced BIOS 600. The division between early POST 510 and the rest of POST 520 is a pragmatic one, POST is divided into a large number of routines which are executed under the control of the POST dispatcher routine 505. Early POST 510 is preferably the set of POST routines which are required in order to configure the computer sufficiently to allow the network enhanced BIOS 600 to be initialized. As discussed below, early POST 510 preferably includes the operations of: programming the memory controller; determining the size of memory; testing memory; initializing the chipset sufficiently to access a PCI bus if present; initialize and test the interrupt controller; configure an interrupt for the network adapter; and initialize a VGA controller if present. Early POST 510 may optionally also program other chipset registers. Early POST routines 510 are preferably stored in nonvolatile memory 125.

The network enhanced BIOS 600 augments the conventional BIOS section 500 with an initialization section 610, a 32-bit protected mode kernel 620 incorporating a kernel dispatcher 621 and a loader 630. The network enhanced BIOS 600 further augments the conventional BIOS section 500 with a protocol stack 640 which exploits the services provided by the kernel. Since modern operating systems normally include a protected mode kernel of their own, the network enhanced BIOS 600 normally terminates upon booting of the operating system, however, a variation of the present invention allows at least a portion of the network enhanced BIOS 600 to remain in memory. This resident portion is used to interface to the watchdog detection mechanism described below.

Figure 4:
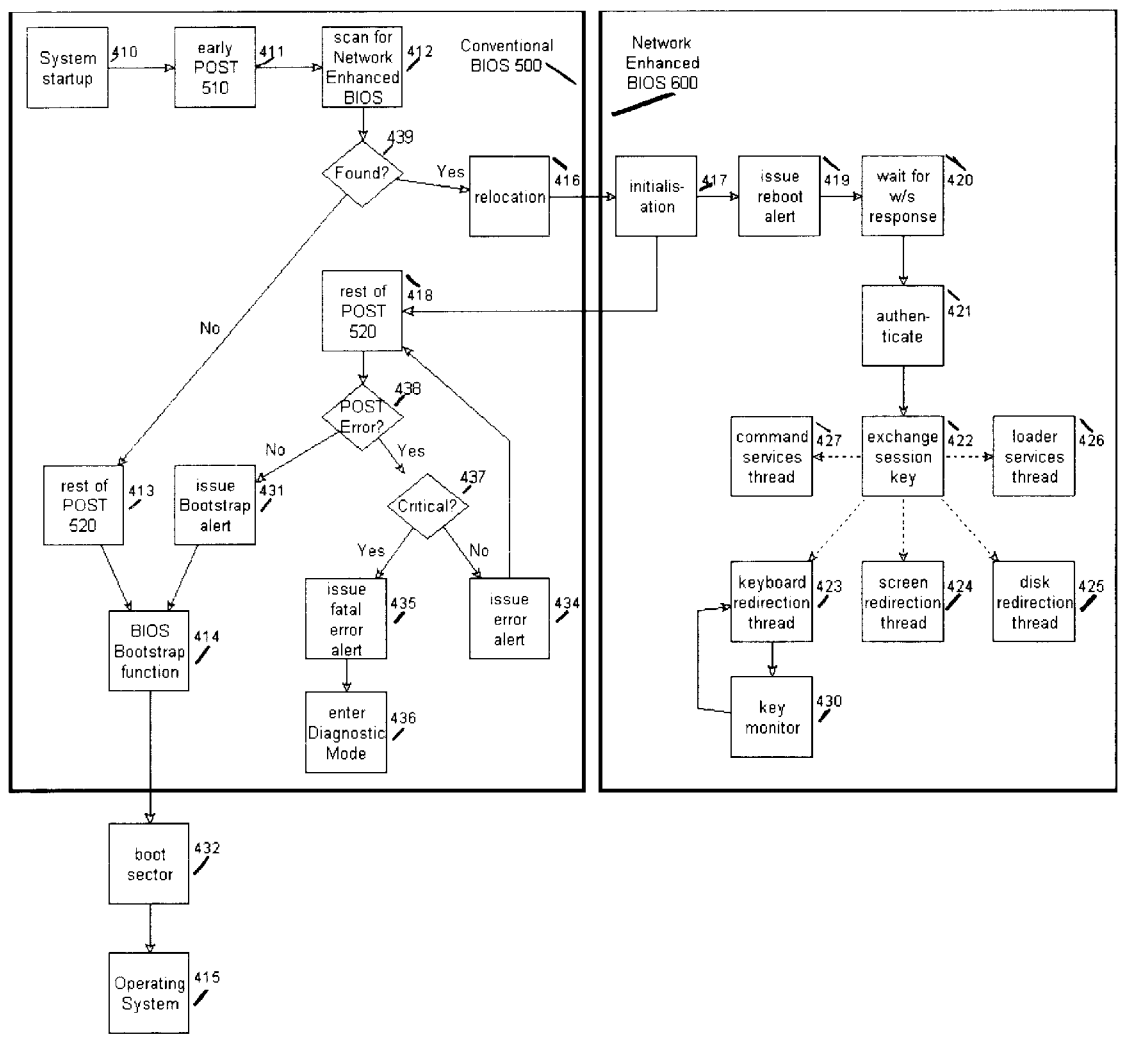
FIG. 4 is a flowchart showing software contained on a computer configured for remote access in accordance with a preferred embodiment of the present invention.

Referring now to FIG. 4, upon system start-up 410, CPU control is passed 411 to the early POST 510 routines. Early POST 510 performs the preliminary tasks necessary to the operation of the system such as programming the memory controller, interrupt controller, system bus controller, and other chipset registers. This operation is identical to that of a BIOS which is not network enhanced.

Control then passes 412 to the network enhanced BIOS installation check routine which is part of the enabler 560 of FIG. 3. The installation check routine scans sequentially through the non-volatile memory 125 looking for a sequence of data known to be the signature indicating the start of the network enhanced BIOS 600 code. If the installation check routine determines 439 that no such signature is present, the rest of POST routine 520 executes 413 and control is passed 414 to a bootstrapping routine supplied by the operating system. As described above, the bootstrapping routine loads 432 the operating system and passes 415 CPU control to it.

If the signature indicating the start of the network enhanced BIOS 600 code is found then a relocation routine 416 copies the network enhanced BIOS 600 from the non-volatile memory 125 into RAM 120, and CPU control is passed 417 to the initialization routine 610 of the network enhanced BIOS 600 code which is at a known offset from the start of the signature. Since the conventional BIOS 500 typically operates in real mode, the network enhanced BIOS initialization routine 610 switches the CPU into protected mode and initializes the 32-bit kernel 620, and each component of the protocol stack 640.

As shown in FIG. 4, the network enhanced BIOS kernel 620 is preferably multithreaded, that is, it supports the apparently simultaneous execution of multiple tasks by switching the CPU control from one task to another according to which task has the highest priority. Tasks may be blocked from executing if they are awaiting some external event, or waiting for another task on which they are dependent to complete execution. To assist with the cooperation between tasks, the kernel provides functions for signal, semaphore and mutual exclusion functions, which will be familiar to those of skill in the art. The switching of CPU control between the different tasks is performed by the kernel dispatcher 621.

A number of threads are started at this time by the network enhanced BIOS initialization routine 610 to support the network protocol stack 640, and different features of the communication with the management workstation 200 application. These threads are preferably 32-bit protected mode code and are discussed below where these features are further explained.

The method of inter-operation of the conventional BIOS 500 with the network enhanced BIOS 600 employed in the first embodiment of the present invention will now be described. The detail of the method of inter-operation may be modified without affecting the principle of the present invention.

Figure 8:
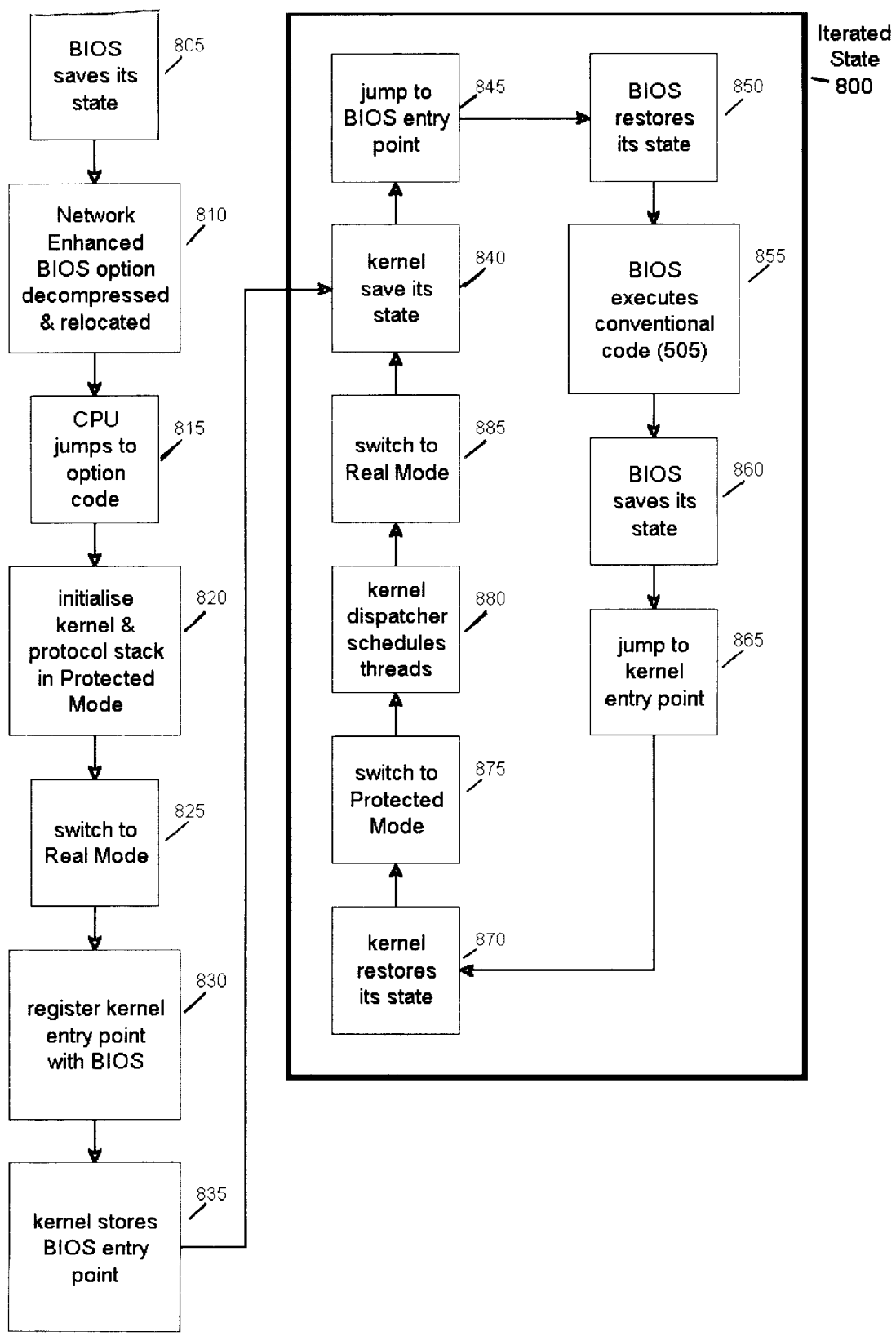
FIG. 8 is a functional block diagram of a mechanism in accordance with the present invention for handling transition between modes of the BIOS.

Referring to FIG. 8, the initial transition from the conventional BIOS code to the network enhanced BIOS 600 is illustrated in further detail, as is the iterated process of inter-operation switching which occurs subsequently. The BIOS saves its state 805, that is stores all the CPU registers and flags in a memory data area. The network enhanced BIOS 600 code and data is then decompressed and relocated 810, and CPU control is transferred to the entry point of this code 815. The kernel, and network protocol stack are initialized 820. The processor is returned to real mode 825, and a conventional BIOS service routine is called to register the address of the kernel mode switch entry point with the BIOS 830. This routine returns the address of the BIOS mode switch entry point 835.

An iterated state 800 where the conventional BIOS and 32-bit kernel threads are run alternately is then entered. The kernel saves its state 840, that is stores all the CPU registers and flags in a memory data area. A jump is then executed 845 to the BIOS mode switch entry point. The previously saved BIOS state is restored 850, and conventional BIOS code executes. CPU control is passed 855 to the POST dispatcher routine 505 of the conventional BIOS section 500, which will execute the current BIOS POST routine until it either completes or suspends because it is awaiting an external event such as an interrupt, or the end of a programmed time delay. Certain POST tasks such as the memory test may take a long time to execute, and within these tasks conventional BIOS will yield control to the 32-bit kernel 620 at regular intervals. At this time the BIOS again saves its state 860, and a jump is executed to the kernel mode switch entry point 865. The kernel restores its saved state 870, reenters protected mode 875, and the kernel dispatcher 621 will then schedule all the threads which are not blocked 880. When the kernel dispatcher 621 determines that there is no thread ready to execute, in other words the system is "idle", the kernel reenters real mode 885, and the process is iterated from the point at which the kernel saves its state 840.

The kernel 620 preferably implements interrupt handling such that if a BIOS POST routine is awaiting an interrupt and has yielded control as a result, when the interrupt occurs during a 32-bit kernel task that interrupt is reflected to the BIOS task. The converse is true, interrupts intended for a 32-bit kernel thread, which occur during the execution of a BIOS task, must be reflected to the 32-bit kernel thread. The management of reflection of interrupts will be familiar to those with knowledge of Microsoft Windows Virtual device drivers (V×D). The performance of processor mode transitions is documented in microprocessor manuals published by Intel Corporation. Similar solutions for other driver types and microprocessor architectures will be apparent to those of ordinary skill in the art in light of the disclosure herein.

The effect of the alternate execution of conventional BIOS and 32-bit network enhanced BIOS tasks is that the network enhanced BIOS threads, and the current conventional BIOS POST task appear to operate simultaneously. Returning to FIG. 4, it can be seen that there are two execution paths after the initialization 417, and multiple execution paths after a session key (discussed below) has been exchanged 422. Conceptually these tasks and threads operate simultaneously. The dashed lines in FIG. 4 indicate a simultaneous execution of threads 423 through 427.

The preferred embodiment of the present invention is described herein using the term "tasks" generally as a term for the sequence of real mode routines from the conventional BIOS which are executed in sequence by the POST dispatcher. Only one of these tasks is ever active at a time. The term "threads" is generally used herein as a term for 32-bit protected mode code being scheduled by the kernel dispatcher 621. These threads conceptually run simultaneously with each other, and a single conventional BIOS POST task. However, it will be apparent to one of ordinary skill in the art that the present invention is not limited to any specific distinction between tasks and threads.

Referring to FIG. 4, the conventional BIOS section 500 continues to execute 418 through its rest of POST routines 520. The network enhanced BIOS 600 now "simultaneously" starts to use the network communication. The detail of the network protocol stack operation is given later, this section gives an overview of the transactions taking place. The network enhanced BIOS 600 first issues 419 an alert packet onto the network 300, and prepares to open a data connection. The network enhanced BIOS 600 waits 420 a predetermined period for a response from a management workstation 200. The format of this alert packet and any which may be issued subsequently is preferably an SNMP (Simple Network Management Protocol) packet. SNMP is a standard protocol within the TCP/IP (Transmission Control Protocol/Internet Protocol) suite and is commonly used to manage and monitor nodes on a TCP/IP network. SNMP and TCP/IP is well known in the art and described, for example, by J. Martin, *TCP/IP Networking*, PTR Prentice Hall (1994). This allows third party Management Software such as HP OpenView™, available from Hewlett-Packard, running on a computer connected to the network to log and display such alerts even if there is no management workstation response. The use of other protocols will be readily apparent to those of ordinary skill in the art.

In the event that no response is received from a management workstation 200 after a configurable time period, which is preferably of the order of five seconds, the network enhanced BIOS 600 may be configured either to attempt to make a connection to a different management workstation, or the operation of the network enhanced BIOS 600 may be terminated, in which case the conventional BIOS section 500 will complete POST in the normal way. If there are no POST errors, the conventional BIOS section 500 will issue 431 a bootstrap alert packet onto the network 300 and transfer 414 CPU control to BIOS bootstrap routine, thence to the boot sector code 432, thence to the operating system 415. If the rest of POST 520 routine detects 438 an error it will determine 437 whether the error is critical or not. If the rest of Post 520 routine detects a non-critical error, the conventional BIOS section 500 will issue 434 a non-critical error alert onto the network 300 and continue processing. If the rest of POST 520 routine detects 437 a critical error it will issue 435 a fatal error alert onto the network 300 and enter 436 a diagnostic mode.

If a response is received from a management workstation 200, it is preferably authenticated 421 such as by calculating a hash function based on the message contents and a secret key which should be known only to the authorized management workstation 200 application and the computer 400 with a network enhanced BIOS 600. This is compared with the message authentication code sent as part of the workstation's response. Only an authorized management workstation will be able to generate a response which contains the correct authentication code.

Further communications between the workstation 200 and network enhanced BIOS 600 are preferably authenticated, such as by using the secret key to exchange 422 a session key, based on a random number. One of the well known key exchange mechanisms may be used such as Diffie-Hellman, as described in Steiner, *Applied Cryptography*. See also, U.S. Pat. No. 4,200,770 to Hellman et al. All future network responses for the remainder of the session are required to use the exchanged key to calculate the message authentication code.

Once the session key has been exchanged, further threads are created to provide the additional services required for the functions to be supported by the management workstation. To provide a remote console facility, a keyboard redirection thread 423 is started which accepts scan codes sent from the management workstation 200 application and puts them into the output buffer of the keyboard controller 145 using a mechanism normally designed for diagnostic purposes. These scan codes are then read by the normal interrupt service routine of computer 400, and the effect is identical to a key having been pressed on the keyboard 140. A key monitoring routine 430 examines all keystrokes received, or typed at the keyboard 140. Certain keys are interpreted as an instruction to perform special actions such as entering a special diagnostic mode or performing a particular type of reboot operation.

A screen redirection thread 424 captures all output to the screen by intercepting the BIOS screen display interrupt 10H, and the BIOS display services output. This is buffered and sent to the management workstation application periodically when it requests a transfer of the outstanding screen data. Screen redirection thread 424 and keyboard redirection thread 423 are described further below in connection with the applications protocol layer.

A disk redirection thread 425 provides the option of support for redirection of accesses to the floppy disk drive. When so configured, the BIOS software disk services interrupt (interrupt 13H on the Intel 80×86) is intercepted and all references to the floppy disk drive (typically the A: drive) are buffered and sent to the management workstation 200 application periodically when it requests any outstanding disk operations to be transferred. To service these references the management workstation application accesses either its own floppy disk, a file on its hard disk, or a file on a drive located on another machine elsewhere on the network. Operation of the BIOS disk redirection thread 425 will suspend until the redirected disk operation has taken place, and the data or result code has been returned via the network 300. The transferred data is returned to the calling application or operating system function as the result of the interrupt 13H operation.

The mechanism of disk redirection as just described may be exploited to provide the computer equipped with a network enhanced BIOS with the ability to bootstrap an operating system from a floppy disk, or file resident on another computer. This is particularly useful in diagnosing faults on a computer where the entire disk subsystem has failed, and may also be exploited to create diskless workstation computers. As described above in reference to the background of the present invention, this function has previously been available on PC compatible computers by installing a network card with a "boot ROM", which is specific to a particular network card, and is supplied at additional cost. According to the present invention this function of booting from and accessing a remote drive is a general purpose function of the network enhanced BIOS 600, and will operate with the wide range of network cards for which standard drivers, such as ODI or NDIS drivers, are available.

A loader services thread 426 provides the management workstation 200 application with an interface to the module loader 630. The management workstation 200 can send messages to the module loader 630 containing code and data to be loaded into RAM, and executed as an additional transient network enhanced BIOS thread.

An asynchronous command thread 427 provides the management workstation 200 with an interface by which it can issue asynchronous commands to the network enhanced BIOS 600, for example to request the transfer of BIOS data, enter the special diagnostic mode, or perform a particular reboot operation.

All the threads described above continue to run throughout the time when the network enhanced BIOS 600 is active, generally until the POST completes. As noted above, in the case when there is no intervention from the management workstation 200, and there is no POST error, an alert indicating that the POST is successfully completed is sent 431.

The network enhanced BIOS 600 may further install its own interrupt handlers for the timer tick interrupt (interrupt 08H on 80×86 microprocessors). The timer tick interrupt vector is directed to a procedure implementing step 860 in FIG. 8, which forces the current real mode code to save its state and jump to the network enhanced BIOS 600. This enables the network enhanced BIOS 600 to continue to obtain CPU control at regular intervals while certain real-mode operating systems, such as MS-DOS, load and are running. Note that the BIOS screen display interrupt 10H may have previously been redirected to a handler as part of the remote console facility already described, and this mechanism remains in place. CPU control then passes to the bootstrap 432.

If the operating system to be loaded is a protected mode operating system, such as NetWare or Windows-NT, then it will switch the processor to protected mode, replace the interrupt vectors including the timer tick and screen display interrupts described above, take over control of the CPU 110, and except for its crash recovery functions, the network enhanced BIOS will cease to function.

If a real mode operating system such as MS-DOS without any protected mode memory manager is loaded then the network enhanced BIOS code will remain in extended memory. When MS-DOS reprograms the interrupt vectors it will chain the existing vectors, so that the MS-DOS interrupt handling routine will execute first, and then the routine to which the vector pointed at the time the MS-DOS bootstrap was started. This has the result that all the functions of the network enhanced BIOS 600 including the remote console facility continue to be available when such operating systems are running.

It will be apparent to those of skill in the art, based on the disclosure contained herein, that additional threads which may be run under the control of the kernel dispatcher, either in a POST time or DOS environment, may be added.

Network Protocol Layer

Figure 5:
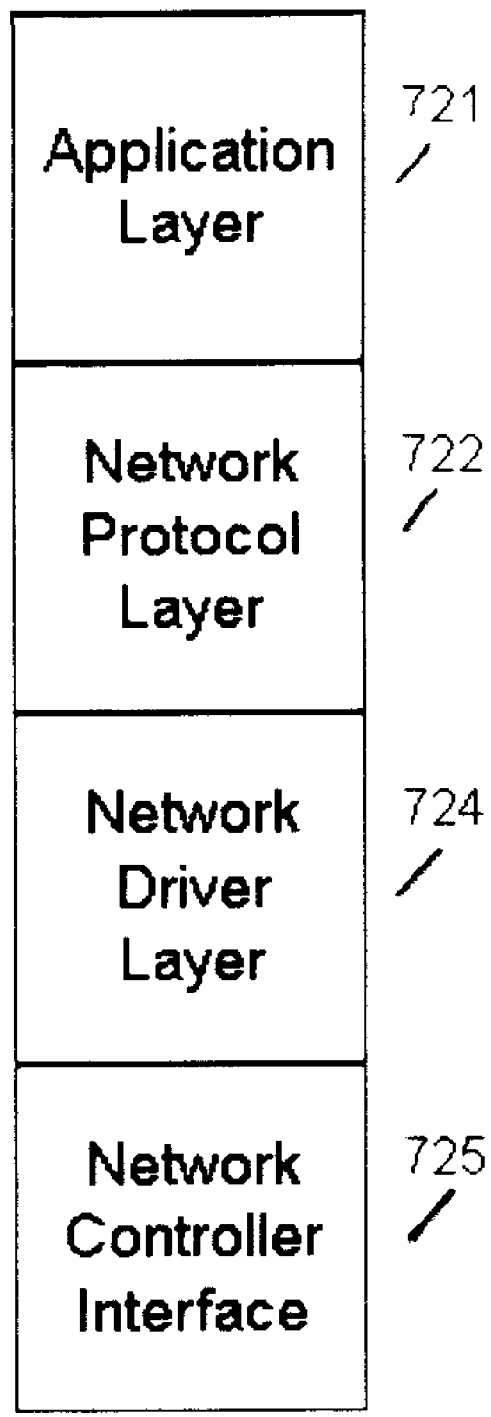
FIG. 5 is a functional block diagram of the layers of the network interface components in accordance with the present invention.

Referring now to FIG. 5, a preferred method of providing a network interface within the BIOS will be described.

Generally network support is divided into software layers. For example, the international standards organization has defined a seven layer model for networking support. Each layer within the division may use the services provided by the layer "below" it, and provides services to the layer "above."

The network driver layer 724 is the bottom software layer. The layer below it is the networking hardware itself—the Network Controller Interface 725. The network driver layer 724 provides services to the networking protocol layer 722 above.

Figure 6:
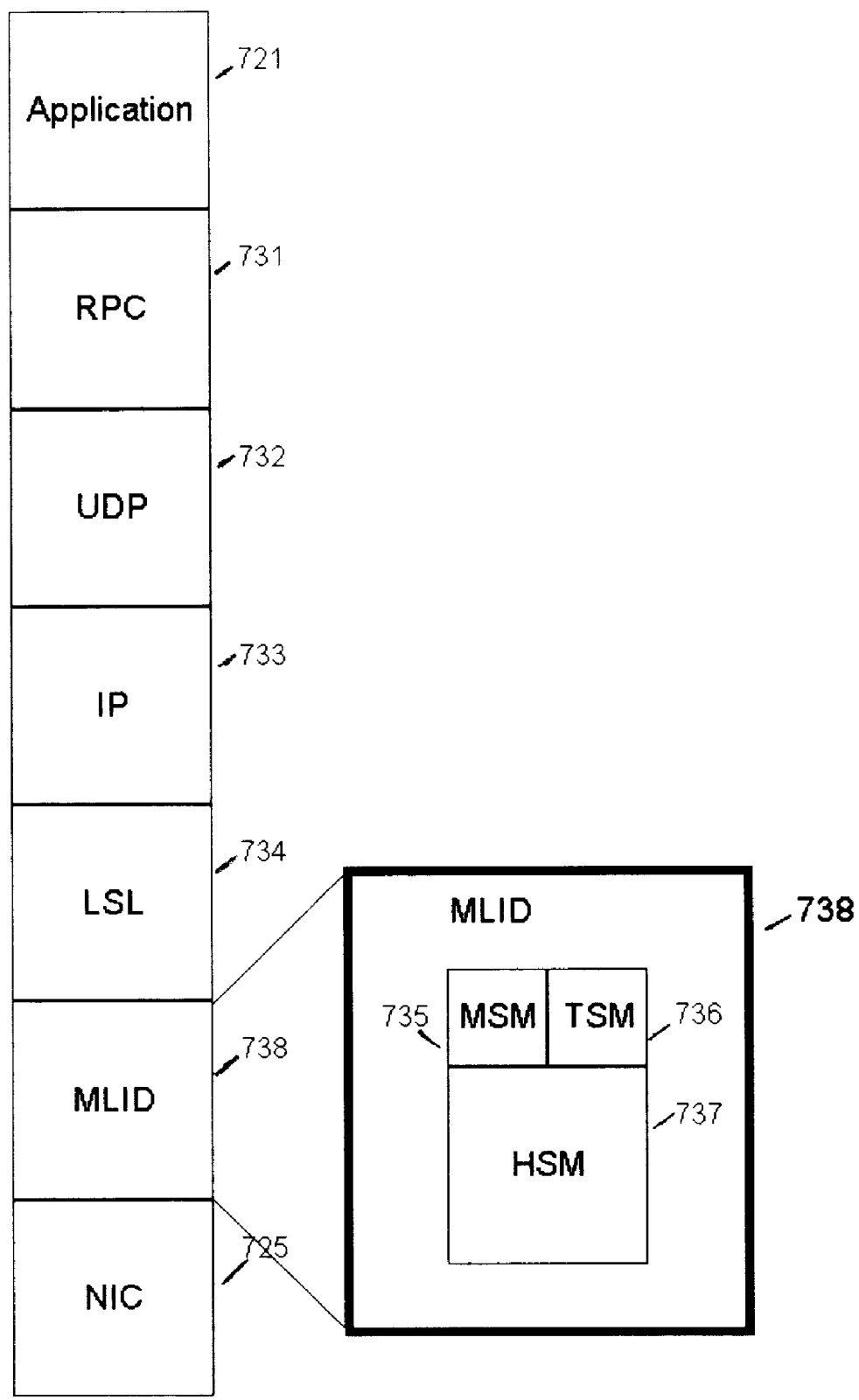
FIG. 6 is a function block diagram of a network protocol stack implemented by network enhanced BIOS in accordance with a preferred embodiment of the present invention.

The networking protocol layer 722 is itself logically broken into layers where lower level protocols are used to enable higher level protocols to operate. For example, a connectionless datagram protocol which delivers packet data without guarantee of delivery or the sequence of delivery (e.g. Unreliable Datagram Protocol (UDP)—732 of FIG. 6)) is used by a higher level protocol that supports guaranteed sequenced data delivery (e.g. Transmission Control Protocol (TCP)). The preferred embodiment of the invention implements only a connectionless datagram protocol to conserve non-volatile RAM space. The UDP 732 passes IP datagrams, or packets, to the IP layer 733 (FIG. 6).

The function of the IP layer 733 is to make the topology and physical characteristics of the network 300 transparent.

The topmost layer in the model is the application layer 721 which uses the services provided by the protocol layer 722 to transfer data over the network.

The Network Driver Layer

The network driver layer 724 couples the networking protocol layer 722 with the network card hardware 725. The network driver layer 724 is preferably implemented in accordance with standard interface specifications. As noted above, two possible specifications, among others, are ODI and NDIS. The implementation described herein details usage of drivers written in accordance with the ODI standard. It will be obvious to one of skill in the art to implement a network enhanced BIOS that will support use of drivers developed according to other standards, such as NDIS or UNIX standards, or even to support multiple standards.

Referring now to FIG. 6 the preferred embodiment of the network protocol stack will be described. The ODI specification defines an interface that separates the network device driver 724 from the upper layers. The Link-Support Layer (LSL) 734 provides registration and buffer allocation services to both the upper layers of the protocol stack, and the network drivers. The components of the network device driver are known collectively as Multiple Link Interface Drivers (MLID). The MLID 738 may itself be separated into three components, the Media-Support Module (MSM) 735, the Topology-Specific Module (TSM) 736, and the Hardware-Specific Module (HSM) 737. The MSM routines 735 are common to all drivers and support the interfacing of the network driver layer 724 to the network enhanced BIOS. The TSM routines 736 are common to drivers for a specific networking technology, such as Ethernet or Token Ring. The HSM routines 737 are specific to each particular NIC 170. The HSM routines 737 must handle NIC initialization, power-up, shutdown, reset, packet receipt and transmission, and timeout.

In order to facilitate network card driver development, much of the code that is common to many TSM and MSM routines have been identified and placed by third party developers into a commonly available set of routines that can be used by the driver. These routines may be ported to be incorporated in the BIOS and execute without operating system support. These TSM and MSM routines may, in turn, be relied on by the HSM drivers 737. By definition, an ODI compliant HSM device driver must utilize only ODI specified services. Thus a network enhanced BIOS 600 which supplies those TSM and MSM services will be able to support an ODI compliant HSM device driver without assistance of an operating system.

Implementing the MSM and TSM routines in the network enhanced BIOS 600 preferably is performed via the addition of a small multitasking kernel, as already described above.

The network enhanced BIOS 600 preferably implements the LSL, MSM and TSM routines; however, much of the functionality of these routines may be omitted to conserve nonvolatile RAM 125, in which they are preferably stored. In this manner, the network enhanced BIOS 600 provides the networking interface card 170 with an environment that is similar to the one provided by the operating system, and allows existing standards-compliant device drivers to function for the purposes herein without modification. The optimal minimal set of routines is determined by inspecting a number of different ODI drivers, available from different manufacturers, and establishing which routines are necessary for the application level services which are to be supported by the network enhanced BIOS. The preferred set of imported functions for NE2000, Intel EtherExpress, and 3Com 90x, as currently understood by the inventors, is listed in TABLE 1 below:

TABLE 1

| | |
|---|---|
| EtherTSMFastProcessGetRCB | MSMParseCustomKeywords |
| EtherTSMFastRcvComplete | MSMParseDriverParameters |
| EtherTSMFastSendComplete | MSMPrintString |
| EtherTSMGetASMHSMIFLevel | MSMPrintStringWarning |
| EtherTSMGetNextSend | MSMRdConfigSpace16 |
| EtherTSMGetRCB | MSMRdConfigSpace32 |
| EtherTSMRegisterHSM | MSMRdConfigSpace8 |
| EtherTSMSendComplete | MSMReadPhysicalMemory |
| EtherTSMUpdateMulticast | MSMRegisterHardwareOptions |
| GetCurrentTime | MSMRegisterMLID |
| MSMAlertFatal | MSMReturnDriverResources |
| MSMAlertWarning | MSMReturnRcvECB |
| MSMAllocPages | MSMScanBusInfo |
| MSMAllocateRCB | MSMScheduleIntTimeCallBack |
| MSMDriverRemove | MSMSearchAdapter |
| MSMFreePages | MSMSetHardwareInterrupt |
| MSMGetMicroTimer | MSMWrtConfigSpace16 |
| MSMGetPhysical | MSMYieldWithDelay |
| | IOConfigurationList |

The Protocol Layers

Figure 7:
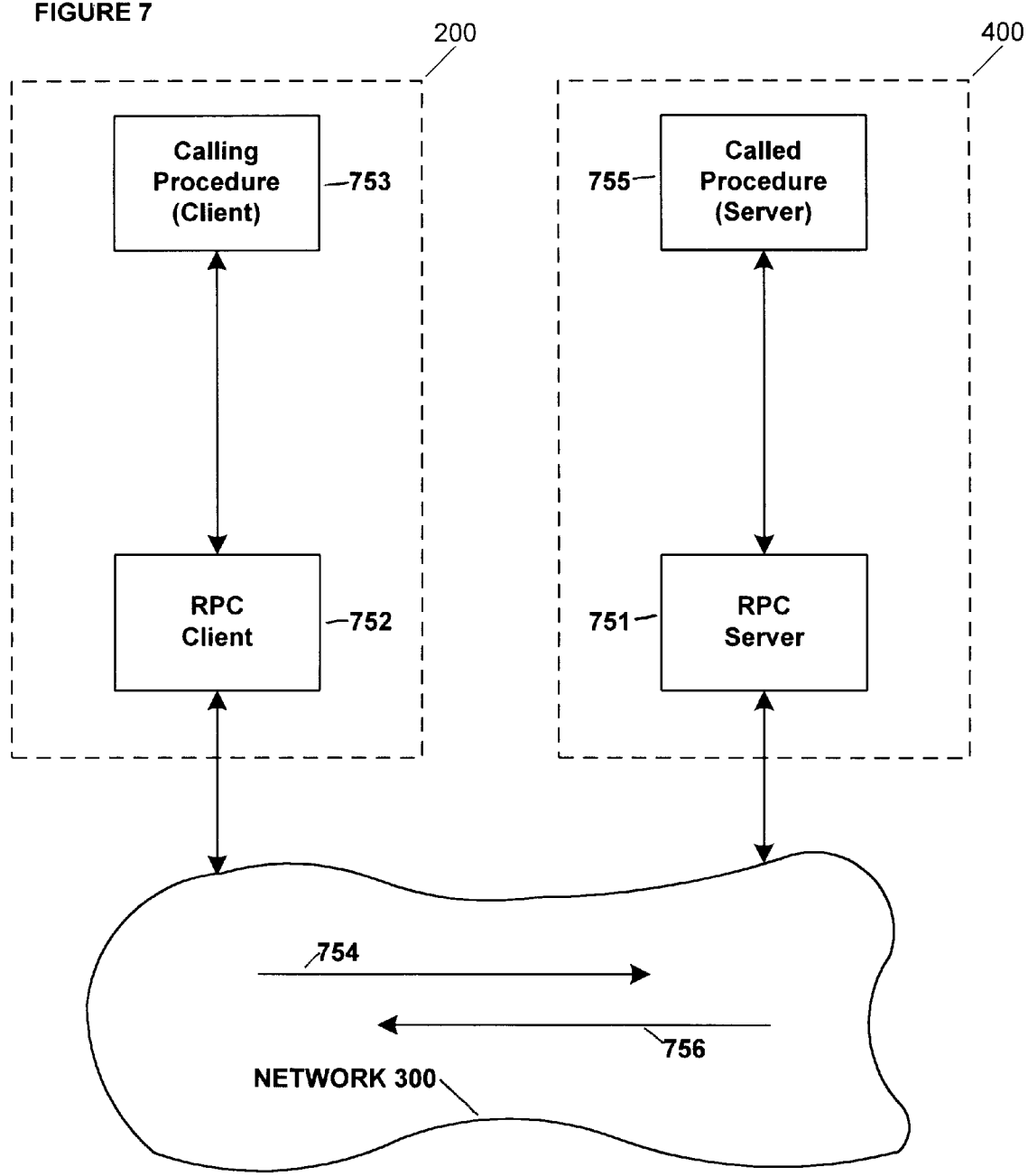
FIG. 7 is a functional model of an RPC facility implemented in accordance with the present invention.

To facilitate application development, the network enhanced BIOS 600 also preferably implements some of the various protocol layers. Two families of protocols are preferably implemented: Internet Packet Exchange/Sequenced Packet Exchange (IPX/SPX), with its required lower level protocols, which is common on NetWare™ based networks; and the Transmission Control Protocol/Internet Protocol (TCP/IP) protocol family, with its support protocols such as Internet Control Message Protocol (ICMP). However, where nonvolatile RAM is at a premium, the implementation may omit some or all of this functionally. For example, the network enhanced BIOS 600 may implement IPX and not SPX which guarantees packet delivery and is implemented on top of IPX. The RPC Layer To further facilitate application development a protocol layer providing the functionality of remote procedure call (RPC) 731 (FIG. 6) is preferably implemented. This is a subset of the functionality of RPC described for example by Nelson B. J., Birrell A. D., *Implementing Remote Procedure Calls*, ACM Transactions on Computer Systems, 2(1), February 1984. As shown in FIG. 7, an RPC server 751 is provided within the network enhanced BIOS 600, and an RPC client 752 is provided within the management workstation 200 application. This allows an application program on the management workstation 200 to include a simple function call 753, the parameters of which are passed 754 using the lower level network protocols over network 300 to the machine 400 with the network enhanced BIOS 600. The RPC function is then executed by a service routine 755 on said network enhanced computer 400, and the result returned 756 to the management workstation. The client calling procedure 753 and server called procedure may interface with a calling stub, or called stub, respectively (not shown). This provides a simple way in which application programs can interact with the network enhanced BIOS 600. Preferably, the network enhanced computer 400 authenticates the RPC requests using a message authentication code protocol such as already described above.

The RPC mechanism also provides a means for OEMs to implement enhanced services, such as accessing data from server management hardware or loading diagnostic code at manufacturing test times.

The Application Layer

The Application Layer 721 contains the various application services that an administrator may remotely access.

These applications preferably include redirection of screen and keyboard to the network 300, allowing control of applications through the network, instead of using the local keyboard 140 and video display unit 130. This will facilitate a number of features on the remote console facility such as allowing the remote console facility to observe the messages and any errors reported by the POST and to allow the viewing and changing of parameters controlled by the BIOS using the BIOS setup screens or other BIOS configuration method.

Screen and keyboard redirection through the network 300 may be achieved using threads 423 and 424 (FIG. 4) and the RPC mechanism described above. Keyboard redirection may be achieved by capturing the keystrokes of the workstation 200, and making an RPC call to transfer the scan codes corresponding to the keystrokes from the workstation 200 to the computer 400. A service thread 423 incorporated in the network enhanced BIOS 600 then simulates the effect of that scan code having been received from the local keyboard. Amongst other methods, this simulation may be achieved by sending a special command to the keyboard controller circuit 145, which inserts the transferred scan code into the keyboard controller circuit output buffer.

Screen redirection is more complex because it requires transfer of data from the network enhanced BIOS 600 to the workstation 200 and the described RPC mechanism generally does not allow this transfer to be initiated from the computer 400. Therefore in the workstation 200 application program a call is made to an RPC function which transfers a request across the network 300 which then activates a service routine incorporated in the network interface of the BIOS on the computer 400 which blocks execution of the respective screen redirection threads until there is screen data ready to be sent back to the workstation 200. As noted above, the services are preferably multithreaded, to allow other operations to continue while awaiting screen data. The service routine can capture the screen data by hooking the BIOS screen display service interrupt, or it may be directly linked to BIOS display services code which outputs characters to the screen. When screen data is available it is placed in a buffer in memory, and this causes the RPC server's service thread to be unblocked. A network packet containing screen data is sent. This causes the RPC client thread to unblock, and the screen data is returned to the management workstation application as the result of the original function call.

Other possible applications which exploit the preferred layered architecture, and in particular the RPC function, include diagnosis routines, allowing the network enhanced computer 400 to be tested by issuing test commands and viewing results on the workstation 200 using the network.

Other applications which can exploit the preferred layered architecture will be apparent to those of skill in the art.

Binary Compatibility

Network adapter manufacturers typically supply a file containing an operating system specific device driver with each network adapter. In order to use the network driver developed for such operating systems, the network enhanced BIOS 600 must utilize the binary image contained in the driver file. Under the ODI standard, the driver image is in NetWare Loadable Module (NLM) file format. Drivers supplied by network adapter manufacturers supporting the ODI standard implement the HSM portion of the ODI specification. The loading process must convert this format and load the driver into non-volatile memory. In the loading process, device driver references to external routines and its entry points need to be processed. The NLM format contains information about external routines which are required to support the operation of the code it contains. This is in the form of a table of addresses from which the external routines must be called, and a corresponding reference which may be interpreted as the name of the external routine. During the loading process the required routines are located in memory, and the places in the NLM code which need to reference these external routines are modified. This process will be familiar to those of skill in the art, by whom it is usually referred to as "linking".

In one embodiment of the present invention, a separate operating system based utility reads the NIC manufacturer's supplied driver file, resolves references to external symbols in the driver, and outputs a binary file which is then loaded to non-volatile memory. In an alternative embodiment of the present invention, the driver file will be directly loaded to the non-volatile memory by the BIOS code. The network enhanced BIOS 600 resolves the external references in the driver file at system start-up. As noted above, the external routines referenced by the manufacturer's device driver are implemented within the network enhanced BIOS, eliminating the need to access the operating system.

In addition to the actual driver code and data, the driver binary file contains several tables; this includes:

- a file header which describes the location and nature of the various other tables;
- the image of the driver code section;
- the image of the driver data section;
- the name and the usage location of symbols which should be provided by other modules (import table);
- the name and location of symbols that the driver provides that can be used by other modules; and
- a table allowing driver code and data image to be fixed, based on the final address in which the driver is loaded; this table is usually referred as the "fix-up" table.

The driver loading code (either part of the network enhanced BIOS 600, or in a separate operating system based utility) uses the information in these tables, to resolve the references to other modules, and to fix the driver image based on the final loading address.

Operation with modem instead of NIC

As noted above, where no network connection using a NIC is possible it may be desirable to utilize a modem connection as an alternative. This is preferably achieved by creating a software module which implements the MLID portion of the ODI specification, but is adapted to send and receive data via the serial interface of the computer 175, and thence via an external modem 180 to a remote computer. (FIG. 2) Alternatively an internal modem 190 may be utilized. This software module may be linked and installed in the nonvolatile memory as an alternative to the HSM, and by the method described above.

In an alternative implementation, the software module for modem support is preferably designed to provide the same API as the UDP layer of the protocol stack. In this case the UDP, and all lower layers of the protocol stack may be omitted from the nonvolatile storage of the computer.

Operating system failure detection and handling

Operating system 901 (FIG. 9) failure may be detected through any of a number of known techniques or through the novel watchdog mechanism described below.

Many operating system failures result in a controlled failure mode wherein the operating system itself detects the failure and executes an error routine. Operating system code or documentation may be examined to determine the path of execution of such error routine. By the use of a device driver with system level privileges it is possible to modify the error routine to force it to transfer control to a portion of the network enhanced BIOS 600 which has been retained in memory for the purpose. The network enhanced BIOS also preferably provides an Application Program Interface (API) or a simple error routine entry point for the operating system to address when entering controlled failure mode. This is useful in the case where the operating system incorporates an API which can be used to instruct it to direct its error handler routine to external code.

Other techniques for detecting operating system failure include the use of a watchdog timer means. One example of a watchdog timer means is described in the Burckhartt patent, which operates in conjunction with a program running under operating system control. The operating system periodically retriggers the timer during normal operation. If the time period of the timer described in the Burckhartt patent expires without the program retriggering it, the operating system is assumed to have failed. The output of the timer is connected directly or indirectly to the reset pin of the processor, and causes the system to reset. This prevents useful information about the cause of the failure from being collected.

Figure 9:
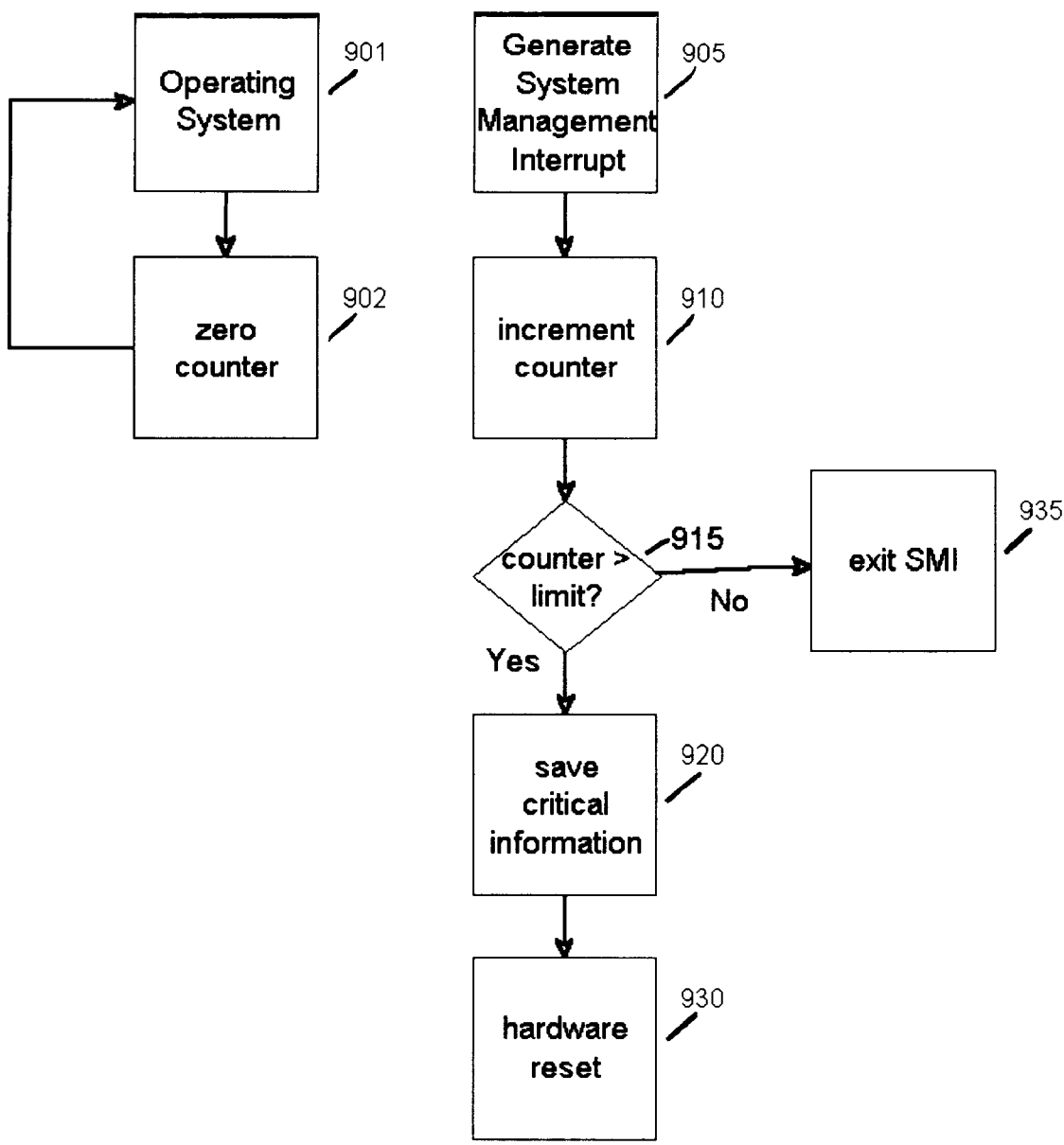
FIG. 9 is a functional block diagram of a watchdog timer mechanism in accordance with the present invention.

With reference now to FIG. 9, the preferred watchdog timer mechanism (described below) of the present invention overcomes these limitations, and is preferable for use with the network enhanced BIOS, in that it allows the data transfer method of the network enhanced BIOS to be exploited. Information valuable for fault diagnosis may be captured and sent to a system manager remote from the failing machine. This is distinguished from the prior art by the fact that the watchdog mechanism does not immediately reset the machine, but instead allows certain preliminary data collection operations to take place first. The System Management Mode (SMM) of the microprocessor is exploited. A data collection routine 920 is installed by the network enhanced BIOS into System Management RAM (SMRAM) 121 (FIG. 2). This data collection 920 routine may be installed during any of a number of the steps described above, for example, during the kernel initialization step 820 of FIG. 8. SMRAM 121 is only accessible when a System Management Interrupt (SMI) has occurred and is being serviced. SMM, SMRAM and SMI are described in the microprocessor manuals available from Intel Corporation. An SMI may be generated by means of an external timer 122 (FIG. 2) connected to the chipset 123 external SMI pin. The chipset 123 combines this using a logical OR function (not shown) with its internal sources of SMI before passing this signal out, and into the microprocessor SMI pin.

Alternatively the chipset may contain internal timers intended for power management or spare timers which may be programmed as a source of periodic SMI. An implementation using such internal timers is preferable since no additional hardware need be provided. The timer generates an SMI 905 at a programmed interval. On each timer event an event counter stored in SMRAM is incremented 910. If the event counter reaches a predetermined value 915 the operating system has crashed and data collection is initiated. If the event counter has not reached the predetermined value, the SMI service routine is exited 935. A program running under operating system 901 control task decrements or zeroes the counter periodically 902 to prevent it from reaching the predetermined value.

The details of implementation of the watchdog function will necessarily vary according to what hardware platform it is deployed on. Other equivalent implementations are possible whereby the count is handled in a different fashion.

It is desirable to be able to run the same program to reset the watchdog program on any machine running the same operating system regardless of the details of implementation of the watchdog mechanism in SMRAM. Therefore the conventional BIOS 500 preferably provides an API to enable watchdog, disable watchdog, set timeout period, and to reset the current count of SMI events. This API is preferably implemented as a service accessed via the BIOS 32-Bit service directory as described in the *Standard BIOS 32-Bit Service Proposal*, Rev. 0.4, published by Phoenix Technologies (May 24, 1993), herein incorporated by reference. The program running under operating system control may utilize a device driver with kernel access rights in order to access the BIOS 32-Bit Services.

When an operating system crash is detected by this preferred watchdog timer method various steps 920 may be taken to preserve information about the crash state for subsequent diagnosis. Examples include copying some or all of the computer's memory to a reserved area on a disk storage medium, often known as a core dump, and preserving the condition of the screen memory and video controller registers, hence any diagnostic information which may have been displayed by the operating system in its error routine. Further data which may be useful to collect will be apparent to those of skill in the art.

After all such steps to preserve the evidence have been made the system may be reset 930. This reset uses a special shutdown code stored in CMOS memory, or other equivalent means, to communicate to the conventional BIOS, early in its POST that the reset was as a result of a crash. This fact can be displayed on the console, and if the network enhanced BIOS is so configured it can enter the special diagnostic mode automatically as a result of such a crash. An SNMP alert conveying the fact of and optionally some information about the crash may be sent via the network 300 to another computer. The system manager remote from the computer then has the option to transfer the diagnostic information to his computer using an application exploiting the transmission mechanisms of the network enhanced BIOS before attempting to reload the computer's operating system.

Special Diagnostic State

As noted above, the BIOS preferably includes a special diagnostic state whereby loading of the operating system is inhibited and the computer waits for further intervention to be initiated before loading the operating system 414 of FIG. 4. This allows for diagnosis of errors which cause the system to reboot. The remote console facility may be used to force the computer into this special diagnostic state. This may be implemented through the use of a remote procedure call as described above. The network enhanced BIOS may also be configured such that if a certain failure condition occurs in the computer the special diagnostic state may be entered automatically.

The remote console on the remote workstation 200 may be programmed, in conjunction with the network enhanced computer 400, to perform a number of useful functions while the network enhanced computer 400 is in the special diagnostic state, such as: causing the network enhanced computer 400 to reset and re-execute the POST routines; causing data to be read from a hard disk 160 on the network enhanced computer 400 and transferred via the network 300 to the remote console; causing data to be transferred via the network 300 from the remote workstation 200 to be the network enhanced computer 400 and written to the hard disk storage 160 on the computer 400. The remote console may further cause data held in the BIOS such as CMOS settings, DMI, ESCD, and BIOS error log, to be transferred via the network 300 to the remote workstation 200, or transferred from the remote workstation and modified in the appropriate storage device in the network enhanced computer 400.

The BIOS may also contain a procedure for remotely loading a portion of BIOS itself to permit a portion of the normal functionality of the BIOS to be downloaded from another computer, such as server 100, on the network 300, thus reducing the amount of nonvolatile storage required on the computer to store the BIOS code. Where an essential portion of the normal functionality of the BIOS, such as the POST code, must be downloaded from the second computer 100 the computer 400 will not function without a proper connection to the network 300. Since the network connections are preferably encoded, this ensures that if the computer is stolen and removed from its network connection, it will no longer complete the execution of POST and will thereby be rendered unserviceable. This will serve as a considerable deterrent to theft.

Additionally, the remote console may cause data to be transferred, via the network 300, and written into the nonvolatile memory device 125 used to hold the conventional BIOS and network enhanced BIOS, thus updating some or part of said BIOS such that a new version or configuration will be used when the first computer is next reset.

It is understood that various other modifications will be apparent to and can be readily made by those skilled in the art without departing from the scope and spirit of the present invention. For example, although reference is made to a network enhanced computer being a desktop computer as shown in callout 400 of FIG. 1, it could also be a server, shown as callout 100 in FIG. 1. Accordingly, it is not intended that the scope of the claims be limited to the description or illustrations set forth herein, but rather that the claims be construed as encompassing all features of patentable novelty that reside in the present invention, including those that would be treated as equivalents by those skilled in the art.

What is claimed is:

1. A method of operating a computer, said computer including a central processing unit (CPU) and a network interface coupling said computer to a network, said method comprising:

automatically executing an initial start-up software on said CPU upon CPU system start-up;

loading and executing a network enhanced software on said CPU on completion of at least a first portion of said start-up software, said network enhanced software supporting a protocol for communicating with workstations coupled to said computer network via said network interface; and loading and executing an operating system software on said CPU after said loading of said network enhanced software, said operating system software being accessible by user-level application software programs executing on said CPU.

2. The method of claim 1 wherein said network interface comprises a network interface card (NIC) and said protocol for communicating with said network comprises a network protocol stack supporting a driver for said NIC.

3. The method of claim 2 wherein said network protocol stack supports a network driver layer which complies with at least a subset of the ODI specification.

4. The method of claim 2 wherein said network protocol stack supports a network driver layer which complies with at least a subset of the NDIS specification.

5. The method of claim 1 wherein said network interface comprises a modem coupled through said CPU and said protocol for communicating with said network supports a modem interface to said network.

6. The method of claim 1 further comprising the step of sending a notification of the CPU system start-up via said network interface to a workstation coupled to said network.

7. The method of claim 6 wherein said network interface comprises a NIC and said notification comprises sending an SNMP alert message via said network.

8. The method of claim 7 wherein said SNMP alert message further comprises an identification of the cause of the CPU system reset.

9. The method of claim 6 wherein said network interface comprises a NIC, said method further comprising the step of sending an SNMP alert message indicating said operating system has been loaded.

10. The method of claim 1 wherein said operating system software will not be executed without the establishment by said network enhanced software of a network connection with a remote workstation attached to said network.

11. The method of claim 10 comprising the additional steps of downloading a second portion of said start-up software from said remote workstation via said network, said operating software not executing until said second portion of said start-up software has been downloaded and executed.

12. The method of claim 1 wherein said network enhanced software multi-tasks a plurality of software threads on said CPU.

13. The method of claim 12 wherein said CPU operates in at least two modes, including a real mode and a protected mode, said network enhanced software executing said plurality of said software threads in said protected mode of said CPU.

14. The method of claim 13 wherein said start-up software executes in real mode of said CPU.

15. The method of claim 14 further comprising the step of executing a second portion of said start-up software after said CPU has begun execution of said networked enhanced software, said start-up software and said network enhanced software sharing control of said CPU after said CPU begins executing said network enhanced software.

16. The method of claim 15 wherein said network enhanced software controls switching of the real mode and protected mode of said CPU.

17. The method of claim 1 wherein said network enhanced software allows a remote workstation coupled to said computer network to access said computer.

18. The method of claim 17 wherein a multi-tasked thread within said network enhanced software allows for said remote workstation to control said CPU.

19. The method of claim 17 wherein said network enhanced software forwards output normally directed to a video controller on said computer to said remote workstation via said network interface.

20. The method of claim 18 further comprising the step of generating a remote procedure call (RPC) from a remote workstation to an RPC server routine executing on said CPU of said computer, said RPC server routine blocking its own execution until data is available for returning to said remote workstation as the result of said remote procedure call.

21. The method of claim 17 wherein said network enhanced software permits said remote workstation to input messages simulating the effect of keystrokes entered on a keyboard attached to said computer.

22. The method of claim 21 wherein said messages are received by a remote procedure call (RPC) server executing on said CPU of said computer, said RPC server inserting said messages into a keyboard controller coupled to said computer.

23. The method of claim 17 wherein said remote workstation displays messages and system errors reported by said start-up software executing on said CPU.

24. The method of claim 1 further comprising the step of said computer automatically entering into a diagnostic state upon pre-determined error conditions, said diagnostic state preventing the loading of said operating system software.

25. The method of claim 17 further comprising the step of entering said computer into a diagnostic state whereby said operating system software will not be loaded, said method further comprising the step of downloading additional software programs to said computer from said remote workstation via said computer network, said additional software programs being executed on said CPU.

26. The method of claim 17 wherein said remote workstation may further perform the steps of controlling power on system test (POST) routines within said start-up software executing on said CPU.

27. The method of claim 17 wherein said remote workstation may force said computer into a diagnostic state preventing said operating system from loading,
whereby said network enhanced software is available for further communication with said remote workstation.

28. The method of claim 17 further comprising the steps of said remote workstation causing data to be read from a direct access storage device locally coupled to said CPU, said data further being transmitted from said computer to said remote workstation.

29. The method of claim 17 further comprising the steps of said remote workstation transmitting data to said computer, said data being written to a direct access storage device locally coupled to said CPU.

30. The method of claim 1 further comprising the steps of downloading from a remote workstation to said computer portions of said start-up software or said network enhanced software,
whereby such start-up software and network enhanced software will be executed upon the next occurrence of system start-up.

31. The method of claim 1 further comprising the step of executing a RPC server on said computer, whereby a RPC client executing on a remote workstation coupled to said network can execute remote procedure calls on said computer.

32. The method of claim 1 wherein said start-up software includes an early POST portion as part of said first portion of said start-up software and a remaining portion of POST, said method further including the steps of:
executing said early POST prior to said CPU's loading of said network enhanced software; and
executing said remaining portion of POST after loading of said network enhanced software.

33. The method of claim 1 further comprising the step of said network enhanced software authenticating any messages received from said network.

34. The method of claim 33 wherein said message authentication is performed using a secret key.

35. The method of claim 1 wherein said CPU operates in at least two modes, including a protected mode, said method further comprising the steps of;
executing said network enhanced software and said operating system software in protected mode; and
terminating execution of said network enhanced software upon loading of said operating system software.

36. The method of claim 1 further including the step of retaining a portion of said network enhanced software in memory after loading of said operating system software.

37. A method of operating a computer, said computer including a central processing unit (CPU) and a network interface coupling said computer to a network, said CPU operating in at least two modes including a real mode and a protected mode, said method comprising:

executing a first basic input/output system (BIOS) on said CPU in real mode, said first BIOS performing a power on system test of said computer;

executing a second BIOS on said CPU in protected mode after execution of a portion of said first BIOS, said second BIOS supporting a network protocol stack; and executing an operating system on said CPU in protected mode after execution of a portion of said second BIOS, said operating system software supporting user-level application software programs executing on said CPU.

38. A network enhanced computer capable of communicating with a workstation coupled to a computer network, said computer comprising:

a central processing unit (CPU);

a network interface coupled to said CPU, said network interface coupling said computer to said computer network;

a nonvolatile memory coupled to said CPU;

an initial start-up software program, said CPU executing said start-up software automatically upon CPU system start-up, at least a first portion said start-up software being stored in said nonvolatile memory;

a network enhanced software, said network enhanced software being executed on said CPU on completion of said at least a first portion of said start-up software, said network enhanced software supporting a protocol for communicating with said workstation coupled to said computer network via said network interface; and an operating system software executing on said CPU, said operating system software being accessible by user-level application software programs, said operating system software being loaded on said CPU after loading of said network enhanced software.

39. The network enhanced computer of claim 38 wherein said network interface is a network interface card (NIC) comprising a device driver program accessible by said CPU, said protocol for communicating with said network comprises a network protocol stack interfacing with said device driver program.

40. The network enhanced computer of claim 39 wherein device driver program substantially complies with the ODI driver specification, said network protocol stack providing at least a subset of the ODI link-support-layer protocol to interface with said device driver program.

41. The network enhanced computer of claim 39 wherein device driver program substantially complies with the NDIS driver specification, said network protocol stack providing at least a second subset of the NDIS protocol to interface with said device driver program.

42. The network enhanced computer of claim 38 wherein said network interface is a modem coupled to said CPU and said protocol for communicating with said network supports a modem interface to said network.

43. The network enhanced computer of claim 38 further comprising a program segment for sending a notification of the CPU system start-up via said network interface to a workstation coupled to said network, said notification being sent prior to said execution of said operating system.

44. The network enhanced computer of claim 43 wherein said network interface is a NIC and said notification comprises an SNMP alert message.

45. The network enhanced computer of claim 38 further comprising a means for preventing the execution of said operating system software prior to the establishment by said network enhanced software of a network connection with a remote workstation attached to said network.

46. The network enhanced computer of claim 38 further comprising a means for downloading a second portion of said start-up software from said remote workstation via said network, said operating software not executing until said second portion of said start-up software has been downloaded.

47. The network enhanced computer of claim 38 wherein said network enhanced software comprises:

a multi-tasking kernel; and a plurality of software threads executing within said multi-tasking kernel on said CPU.

48. The network enhanced computer of claim 47 wherein said CPU operates in at least two modes, including a real mode and a protected mode, said multi-tasking kernel comprising a kernel operating in said CPU protected mode.

49. The network enhanced computer of claim 48 wherein said start-up software executes in real mode of said CPU.

50. The network enhanced computer of claim 49 wherein said start-up software and said multi-tasking kernel share control of said CPU after said CPU begins executing said network enhanced software.

51. A computer capable of interacting with a computer network, said computer comprising:

a central processing unit (CPU) providing at least two modes including a real mode and a protected mode;

a network interface coupling said computer to said computer network;

a nonvolatile memory coupled to said CPU;

a first basic input/output system (BIOS), at least a portion of said first BIOS being stored in said nonvolatile memory such that said CPU calls said first BIOS upon system reset, said first BIOS further performing a power on system test of said computer;

a second BIOS executing on said CPU in protected mode after execution of a portion of said first BIOS, said second BIOS supporting a network protocol stack; and an operating system executing on said CPU in protected mode after execution of a portion of said second BIOS, said operating system supporting user-level application software programs executing on said CPU.

52. A system of remotely administrating at least one computer comprising:

a computer network;

a workstation coupled to said computer network, said workstation executing application software; and a computer comprising:

a network interface coupling said computer to said computer network;

a central processing unit (CPU);

an initial start-up software program, said start-up software executing automatically upon CPU system reset;

a network enhanced software being configured to be executed on said CPU upon execution of said at least a first portion of said start-up software, said network enhanced software supporting a protocol for communicating with said workstation via said network interface; and an operating system software executing on said CPU, said operating system software being accessible by user-level application software programs, said operating system software being loaded on said CPU.

53. The system of claim 52 further comprising a means for said remote workstation to access and control said CPU.

54. The system of claim 53 further comprising a means for said remote workstation to input messages simulating the effect of keystrokes entered on a keyboard attached to said computer.

55. The system of claim 53 wherein said computer may enter into a diagnostic state preventing said operating system software from being loaded, said system further comprising a means for downloading additional software programs to said computer from said remote workstation, said additional software programs being executed on said CPU.

56. The system of claim 53 wherein said remote workstation comprises a means for controlling power on system test (POST) routines within said start-up software executing on said CPU.

57. A computer capable of booting its operating system from a remote direct access storage device coupled to a workstation on a computer network, said computer comprising:

a central programming unit (CPU), said CPU providing a BIOS disk services interrupt for requesting data access;

a nonvolatile memory;

a network interface coupling said computer to said computer network;

a start-up software, at least a portion of said start-up software being stored within said nonvolatile memory, said start-up software being configured within said computer so that said CPU calls said start-up software upon system start up, said start-up software comprising an operating system bootstrap program which utilizes said BIOS disk services interrupt to bootstrap said operating system; and a network enhanced kernel, at least a portion of said kernel being executed by said CPU after execution of at least a portion of said start-up software and before execution of said operating system bootstrap program, said kernel supporting a protocol stack for communicating with said workstation, said kernel redirecting said BIOS disk services interrupt to capture said BIOS disk services interrupt and access said requested data from said workstation.

58. A computer capable of booting its operating system from a workstation coupled to a computer network, said computer comprising:

a central programming unit (CPU), said CPU providing a BIOS disk services interrupt for requesting data access;

a nonvolatile memory;

a network interface card (NIC) coupling said computer to said computer network;

a start-up software, at least a portion of said start-up software being stored within said nonvolatile memory, said start-up software being configured within said computer so that said CPU calls said start-up software upon system start up, said start-up software comprising an operating system bootstrap program which utilizing said BIOS disk services interrupt to bootstrap said operating system; and a network multitasking kernel supporting a protocol stack for communicating with said workstation via said NIC, said multitasking kernel being executed prior to execution of said operating system bootstrap program, said multitasking kernel executing a first disk redirection thread which accesses data from said workstation via said NIC, said BIOS disk services interrupt being redirected to said disk redirection thread, whereby said operating system is bootstrapped from said workstation through said disk redirection thread.

59. The method of claim 3 wherein said network protocol stack is implemented by software stored in nonvolatile memory.

60. The method of claim 4 wherein said network protocol stack is implemented by software stored in nonvolatile memory.

* * * * *